(12) United States Patent
Aiyer

(10) Patent No.: US 9,316,490 B2
(45) Date of Patent: Apr. 19, 2016

(54) METHOD AND SYSTEM FOR MEASURING PATTERNED SUBSTRATES

(71) Applicant: Applejack 199 L,P., San Jose, CA (US)

(72) Inventor: Arun Ananth Aiyer, Fremont, CA (US)

(73) Assignee: APPLEJACK 199 L.P., San Jose, CA (US)

( * ) Notice: Subject to any disclaimer, the term of this patent is extended or adjusted under 35 U.S.C. 154(b) by 105 days.

(21) Appl. No.: 14/260,054

(22) Filed: Apr. 23, 2014

(65) Prior Publication Data

US 2014/0233016 A1      Aug. 21, 2014

Related U.S. Application Data

(62) Division of application No. 12/931,566, filed on Feb. 4, 2011, now abandoned.

(60) Provisional application No. 61/337,642, filed on Feb. 5, 2010.

(51) Int. Cl.
| | | |
|---|---|---|
| *G01B 11/02* | (2006.01) | |
| *G01B 11/24* | (2006.01) | |
| *G01B 9/02* | (2006.01) | |

(52) U.S. Cl.
CPC ........ *G01B 11/2441* (2013.01); *G01B 9/02091* (2013.01); *G01B 2290/70* (2013.01)

(58) Field of Classification Search
CPC .......... G01B 11/2441; G01B 11/0675; G01B 9/02091; G01B 9/0209; G01B 9/02021; G01B 2290/70
USPC ....................................................... 356/497
See application file for complete search history.

(56) References Cited

U.S. PATENT DOCUMENTS

| | | | | |
|---|---|---|---|---|
| 4,596,466 A | * | 6/1986 | Ulrich | ............... G01D 5/268 356/497 |
| 6,501,551 B1 | * | 12/2002 | Tearney | ............ A61B 1/00096 356/477 |
| 7,720,526 B1 | * | 5/2010 | Modell | ............... A61B 5/0066 356/407 |

OTHER PUBLICATIONS

Autocorrelation low coherence interferometery, Modell et al, Optics Communications 281 (2008), pp. 1991-1996.*

* cited by examiner

*Primary Examiner* — Tarifur Chowdhury
*Assistant Examiner* — Jonathon Cook
(74) *Attorney, Agent, or Firm* — Maschoff Brennan

(57) ABSTRACT

A system and method of measuring feature depth using a common path auto-correlation low coherence interferometer including a light source having an output directed toward a first beam splitter, the first beam splitter directing at least a portion of a light beam from the light source toward a sample having two reflective interfaces including a top surface reflective interface and a feature bottom reflective interface. The first beam splitter can also pass toward a second beam splitter each of a reference light beam reflected from the top surface interface and a measurement light beam reflected from the feature bottom reflective interface. The second beam splitter directs the reference light beam to a first mirror and the measurement light beam to a second mirror and combines a reflected measurement light beam from the second mirror and a reflected reference light beam from the first mirror to form an interference pattern.

18 Claims, 11 Drawing Sheets

METHOD AND SYSTEM FOR MEASURING PATTERNED SUBSTRATES

This application is a divisional of and claims priority from co-pending U.S. patent application Ser. No. 12/931,566, filed on Feb. 4, 2011 and entitled "Method and System for Measuring Patterned Substrates," which is incorporated herein by reference in its entirety for all purposes. Through U.S. patent application Ser. No. 12/931,566, the present application also claims priority from U.S. Provisional Patent Application No. 61/337,642, filed on Feb. 5, 2010 and entitled "Method and System for Measuring Patterned Substrates," which is incorporated herein by reference in its entirety for all purposes.

BACKGROUND

The present invention relates to the field of semiconductor manufacturing and in particular to optical metrology of wafer thickness and high aspect ratio (HAR) structures etched into wafers.

Low coherence interferometry (LCI) or optical coherence tomography (OCT) is an optical measurement technique used to measure spacing between interfaces that are separated by optical distances much, much larger than $\gg\lambda$, the wavelength of light used in the measurement. Typical set-up is shown in FIG. 1A. Light beam 101 from a broadband source 100 is split by a beam splitter 500 into a first portion 101A directed towards a sample 300 and into a second portion 101B directed towards the movable reference mirror 200. The reflected beams 101A', 101A" and 101B' are recombined at the beam splitter 500 and directed towards photo diode detector 400.

In standard time domain low coherence interferometers/optical coherence tomography, the measurement arm 103 (the beam path that contains the sample 300) and the reference arm 102 (the beam path that contains the movable reference mirror 200) are initially adjusted so that the reflected beams 101A', 101A" and 101B' interfering at the detector 400 in tandem have zero path-length difference (ZPD) providing a large intensity spike 4001 and 4002, as shown in FIG. 1B, and a corresponding large electrical output (not shown) from detector 400.

The first intensity spike 4001 appears when the reference beam 101B' and the reflected beam 101A' reflected from surface 301 have zero path-length difference. As the reference mirror 200 is moved, intensity spikes appear every time a zero path-length difference condition is met for a corresponding reflected light beams 101A', 101A" reflected from each optical interface 301, 302 and the reference beam 101B'. The distance D traveled by mirror 200 between adjacent intensity spikes 4001 and 4002, as shown in FIG. 1B, corresponds to the optical separation (optical thickness) between those two interfaces 301, 302.

Auto-correlation Low Coherence Interferometer . . . Time Domain: In many implementations of low coherence interferometers, the measurement beam from beam splitter 500 is directed to the sample 300 via an optical fiber. The same optical fiber bundle is also used for receiving the reflected beams 101A', 101A". Since the optical fiber bundle can be several centimeters to meters long, temperature fluctuations in the measurement path will significantly influence the thickness measurements. To minimize this error, an auto-correlation approach is implemented as described in U.S. Pat. No. 7,426,036 and US Patent Application 20090065478.

In auto-correlation low coherence interferometers, the reflected beams 101A', 101A" reflected from the sample 300 enter an auto-correlator optical unit 1000 as shown in FIG. 2A. Reflected beams 101A', 101A", 101B' from the different interfaces 301, 302 and the reference mirror 200, respectively, are amplitude divided and then recombined by the beam splitter 600 in the auto-correlator optical unit 1000. When the mirrors 201 and 202 are equidistant from the beamsplitter 600, a zero path-length difference condition is met for all interfaces (that is return from 200 and 301 and 302 here) and the detector 400 will produce an intensity spike 2001. This condition is schematically shown in FIG. 2B. When mirror 201 is moved away from beamsplitter 600, the detector 400 signal will drop sharply as the overlapping beams move away from the zero path-length difference condition. As the mirror 201 is further displaced from the beamsplitter 600, an increase in detector 400 output which corresponds to intensity spike 2002 will be observed at a particular location of mirror 201. This signal strength corresponding to intensity spike 2002, though smaller than the first signal strength corresponding to intensity spike 2001, represents a zero path-length difference condition between reflected beam 701A' reflected from mirror 201 in arm 701 and the reflected beam 702A' reflected from interface 301 in arm 702. This situation is represented schematically in FIG. 2C. E-field 201' refers to reference beam 701A reflected from mirror 201 and e-field 202" refers to reference beams 702A' reflected from mirror 202. Similarly E-fields 301' and 301" refer to beams 101A' reflected from interface 301 and e-fields 301' and 302' refer to beams 101A" reflected from interface 302. E-fields 301' and 302' refer to beams from arm 701 and e-fields 301" and 302" refer to beams from arm 702. Referring to embodiment in FIG. 2A, those skilled in the art will notice that the location of reference mirror 200 can be in the beam path 103.

SUMMARY

Broadly speaking, the present invention fills these needs by providing a common path auto-correlation low coherence interferometer system and method. It should be appreciated that the present invention can be implemented in numerous ways, including as a process, an apparatus, a system, computer readable media, or a device. Several inventive embodiments of the present invention are described below.

One embodiment provides a common path auto-correlation low coherence interferometer system. The system includes a light source having an output directed toward a first beam splitter. The first beam splitter is configured to direct at least a portion of a light beam output by the light source toward a sample having two reflective interfaces including a top surface reflective interface and a feature bottom reflective interface. The first beam splitter also passes toward a second beam splitter each of a reference light beam reflected from the top surface interface and a measurement light beam reflected from the feature bottom reflective interface. The second beam splitter configured to direct the reference light beam to a first mirror and the measurement light beam to a second mirror. The first mirror can be a first distance from the second beam splitter and the second mirror is a second distance from the second beam splitter. The second beam splitter further configured to combine a reflected measurement light beam reflected from the second mirror and a reflected reference light beam reflected from the first mirror and direct a resulting interference pattern toward a detector. The first mirror is a scanning mirror such that a difference distance between the first distance and the second distance is equal to an optical separation between the feature bottom reflective interface and the top surface reflective interface.

The second distance can be offset from the first distance a known offset distance. The detector can be a spectrograph.

The detector can have a per pixel bandwidth that can accommodate a coherence length that is about twice a feature depth.

The light source can be an ultraviolet light source. Alternatively or additionally, the light source can be a polarizing light source and the system can also include a selected polarized light beam reflective element disposed in a beam path between the first beam splitter and the sample and the second beam splitter can be a polarizing beam splitter. The system can also include a 45 degree polarizer element disposed in a beam path between the second beam splitter and the detector.

The system can also include a filtering element disposed in a beam path between the second beam splitter and the first mirror. The system can also include a plate disposed in a beam path between the second beam splitter and the second mirror.

Another embodiment provides a common path auto-correlation low coherence interferometer method. The method includes directing a light beam emitted from a light source output toward a first beam splitter, directing at least a portion of the light beam output by the light source through the first beam splitter toward a sample having two reflective interfaces including a top surface reflective interface and a feature bottom reflective interface. Each of a reference light beam reflected from the top surface reflective interface and a measurement light beam reflected from the feature bottom reflective interface are passed through the first beam splitter and toward a second beam splitter. The reference light beam is reflected through the second beam splitter to a first mirror. The measurement light beam is passed through the second beam splitter to a second mirror. The first mirror is a first distance from the second beam splitter and the second mirror is a second distance from the second beam splitter. The first mirror is a scanning mirror. A reflected measurement light beam from the second mirror and a reflected reference light beam from the first mirror are combined in the second beam splitter to form a resulting interference pattern which is directed toward a detector. The first mirror is scanned such that a difference distance between the first distance and the second distance is equal to an optical separation between the feature bottom reflective interface and the top surface reflective interface.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

DETAILED DESCRIPTION

Figure 1A:
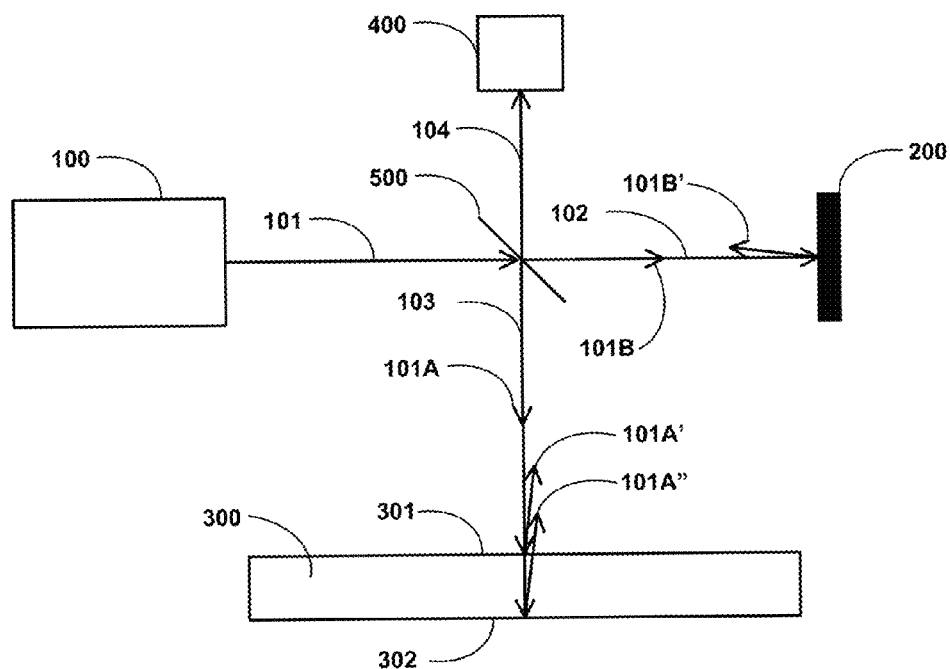
FIG. 1A is a schematic of a typical, prior art Low Coherence Interferometry or Optical Coherence Tomography system.
Figure 1B:
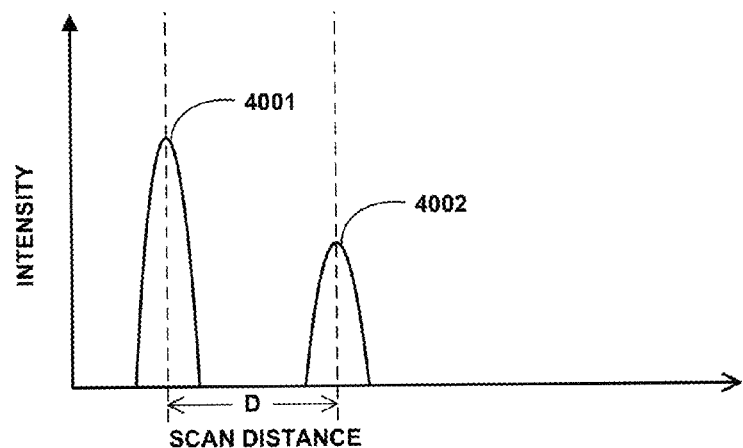
FIG. 1B is a graph of intensity spikes corresponding to different optical interfaces in the typical, Low Coherence Interferometry or Optical Coherence Tomography system.

The features and advantages of the present invention are illustrated in detail in the accompanying drawings, wherein like reference numerals refer to like elements throughout the drawings. Although the drawings are intended for illustrating and explaining the present invention, they are not drawn to scale.

Feature Depth and Profile: The present invention describes a system and method for measuring feature dimensions such as substrate thickness, trench depth, via depth, feature height and their profile by examining light reflected by substrate or transmitted through the substrate. The light is preferably provided by a single wavelength or multi-wavelength light source. If the substrate/wafer is silicon then it is transparent to infrared radiation in the wavelength region from about 1μ to about 25μ. Silicon wafer with both sides polished will act like an etalon causing the incident wavefront to undergo multiple reflections/transmissions at both interfaces. A high frequency fringe pattern could be registered if the reflected or transmitted light is detected using a high dispersion spectrograph. However, with a low coherence interferometer that is described in this invention, occurrence of high frequency fringe pattern can be avoided. The lower frequency fringes that are generated can be analyzed for accurate determination of feature depth and feature profile.

The auto-correlation approach in prior art still suffers from path separation between reflected reference beam 101B' and reflected measurement beams 101A', 101A" when the two are launched and received. The present invention eliminates that error source by using the beam 101A' reflected from the first interface 301 as the reference, i.e., a virtual interface. In addition, the implementation of virtual interface allows the use of, static mirrors or high precision short scan mirrors, in frequency domain and time domain optical coherence tomography, while measuring thicker samples.

Commonpath Auto-correlation Low Coherence Interferometer: Time Domain optical coherence tomography: In the embodiment shown in FIG. 3, when mirrors 201 and 202 are equidistant from the beamsplitter 600, a zero path-length difference condition is met for all interfaces (301 and 302 for the sample 300 shown herein) and the detector 400 will produce an intensity spike 3001. The occurrence of intensity spike 3001 as a function of mirror 201 scan position is shown on the right hand side in FIG. 4A. When mirror 201 is moved away from or towards beamsplitter 600, the detector signal will drop sharply as the overlapping beams move away from the zero path-length difference condition. Upon further displacement of mirror 201 from or towards beamsplitter 600, another sharp increase in detector 400 output as a function of mirror 201 position will be observed. This is represented by intensity spike 3002 in FIG. 4B. This signal represents a zero path-length difference condition between reflected beam 701A' reflected from interface 301 in arm 701 and the reflected beam 702A' reflected from interface 302 in arm 702. E-fields 301' and 301" refer to beams 701A' and 702A', respectively, reflected from mirrors 201 and 202, respectively and e-fields 302' and 302" refer to reflected beams 701A' and 702A', respectively, reflected from mirrors 201 and 202, respectively. The distance through which mirror 201 is moved is the optical separation between the two interfaces 301, 302. The environment of beam paths in arms 701 and 702 can be controlled by means known to those skilled in the art. This prevents environment and polarization induced error in measurement. Thus this commonpath embodiment of an auto-correlation Low Coherence Interferometer will perform as a robust time domain optical coherence tomography tool.

Fixed Offset Commonpath Auto-correlation Low Coherence Interferometer . . . Time Domain optical coherence tomography: In fixed off set time domain optical coherence tomography embodiment, the optical set-up is similar to that shown in FIG. 3. The two mirrors in the auto-correlator optical unit 1000 are adjusted so that arms 701 and 702 have a pre-fixed path difference between them creating a mirror offset such that $d1 \neq d2$. This can be achieved while the auto-correlator optical unit 1000 is being assembled by offsetting at least one of mirrors 201 or 202 from a zero path-length difference condition. In this configuration, the time delay between various electric fields (e-field) received by the detector 400 can be schematically shown as in FIG. 5. For ease of visualization, e-fields are presented in pulse mode by vertical arrows. As an example, moving mirror 201 away from beamsplitter 600 reduces the optical path difference or time delay between e-field 301' in arm 701 and e-field 302" in arm 702, which otherwise would be determined solely by the optical thickness of the sample 300. The fixed mirror offset approach is equivalent to creating virtual interface(s) that produce optical path differences between interfaces that are different from optical path differences dictated by the actual separation of the interfaces 301, 302.

In this example, virtual interfaces are represented by delayed e-fields 301' and 302'. The value of the mirror offset determines the effective location of virtual interface(s) or alternatively the mirror offset determines the change in optical path difference between the reference beam 101A' from interface 301 and reflections 101A" from other interfaces 302. If the bandwidth of the light source 100 is such that by off-setting the beam paths in arms 701 and 702, the time delay between e-fields from virtual and physical interfaces can be reduced to within the coherence length of the light source 100; then one can in effect create interference between these e-fields by scanning either one of mirrors 201 or 202. The scanned position of the detected intensity spike will carry information about separation between the virtual interface and a physical interface. From knowledge of this and the mirror offset, the separation between the two physical interfaces can be determined. In this example, it is the separation between interfaces 301 and 302. This approach can be extended to multiple interfaces. The advantage of this approach is that it affords a large working distance while enabling use of high precision scanning stage that needs to scan through smaller scan range. Smaller scan range means higher throughput.

Fixed Offset Commonpath Auto-correlation Low Coherence Interferometer: Frequency Domain optical coherence tomography: In fixed off set frequency domain optical coherence tomography (FOFD-OCT) embodiment, the optical set-up is similar to that shown in FIG. 3. The two mirrors in the auto-correlator optical unit 1000 are adjusted so that arms 701 and 702 have a pre-fixed path difference between them such that $d1 \neq d2$. This can be achieved while the auto-correlator 1000 is being assembled by offsetting 201 or 202 from a zero path-length difference condition. In frequency domain optical coherence tomography, the interference between e-fields from virtual interface and physical interface could be detected using a spectrograph wherein the interfering wavelengths are separated using a dispersive element and fringe pattern resulting from interfering wavelengths are recorded using an array detector.

In fixed offset frequency domain optical coherence tomography embodiment, mirror 201 or 202 may not be scanned. The condition under which it may be scanned is discussed later.

Figure 5:
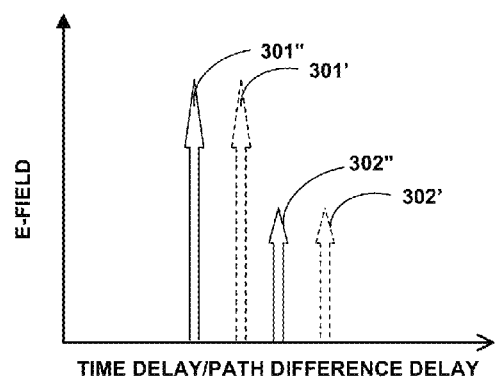
FIG. 5 is a graphical representation of e-fields seen by a detector when common path interferometer beam paths have fixed off-set.

The fringe spacing in the recorded fringe pattern would depend on the optical separation between the virtual interface and physical interfaces. Large interface separation results in higher fringe frequency. Consequently, a higher resolution spectrograph will be needed to process the signal. Separation between virtual interface and physical interfaces may be reduced by changing optical path difference between arms 701 and 702 by a known distance which will reduce the spectral fringe frequency. That will facilitate the use of a lower resolution spectrograph to process the signal. Such spectrographs may be more cost and form effective than high dispersion spectrographs. Referring to FIG. 5, interference between 301' & 301", 301' & 302", and 302' & 302" will provide information on mirror offset and interface separation. When more interfaces are present, more complex fringe patterns will appear in the recorded spectrum.

A fast Fourier transform of the fringe pattern will parse out different thicknesses or interface separations information present in the detected signal. Using a simple algorithm, thickness values can be sorted through and correct values assigned to the appropriate optical thicknesses. The advantage of this approach is that it affords a large working distance while enabling measurement over large dynamic range. Static mirrors mean larger mean time between failures.

References given here and the references therein allude to prior art that are pertinent to this invention.

Figure 3:
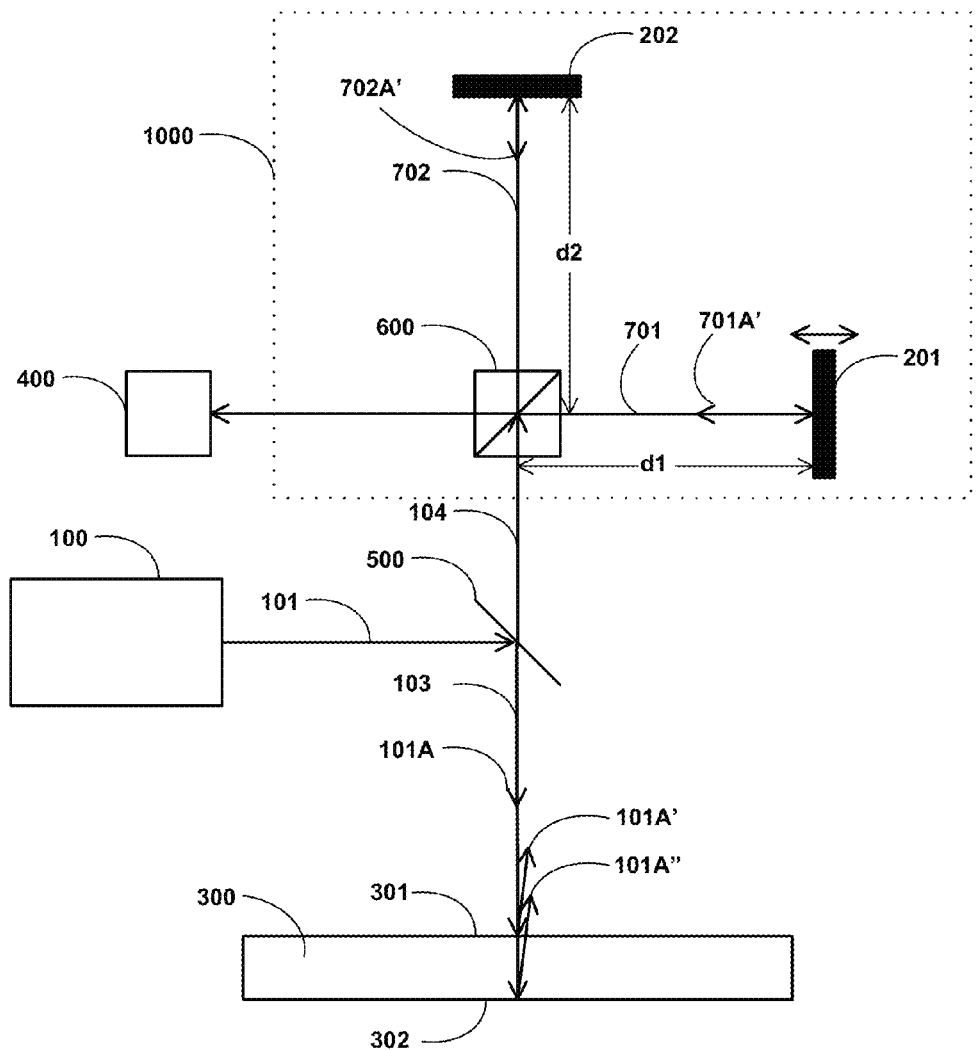
FIG. 3 is a schematic of an embodiment of the current invention for common path auto-correlated low coherence interferometer.
Figure 4A:
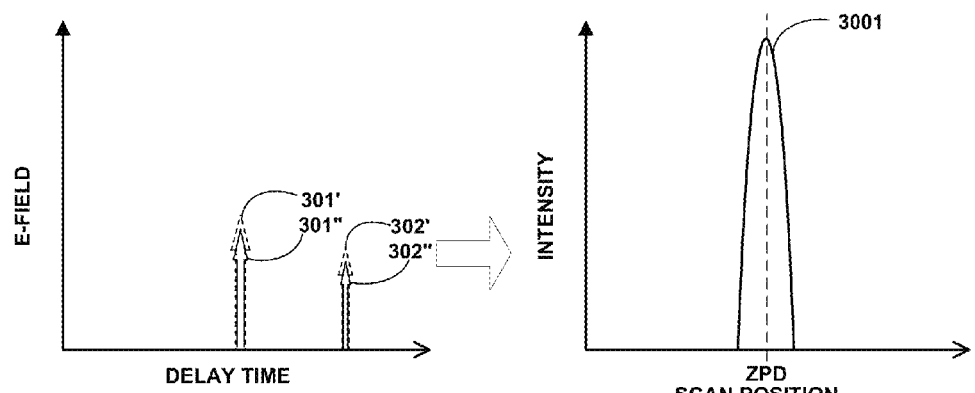
FIGS. 4A and 4B are graphs of pulse mode representations of e-field from different interfaces in the sample in embodiment shown in FIG. 3. Intensity spikes are due to interference generated at appropriate scan position.
Figure 4B:
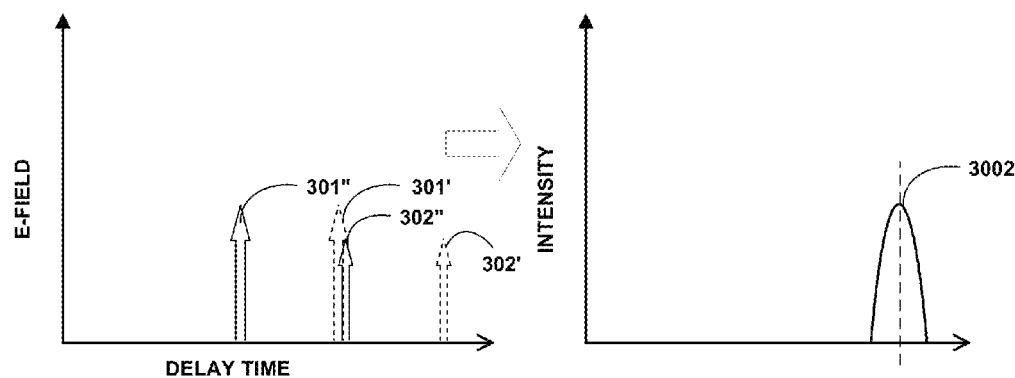
Figure 6A:
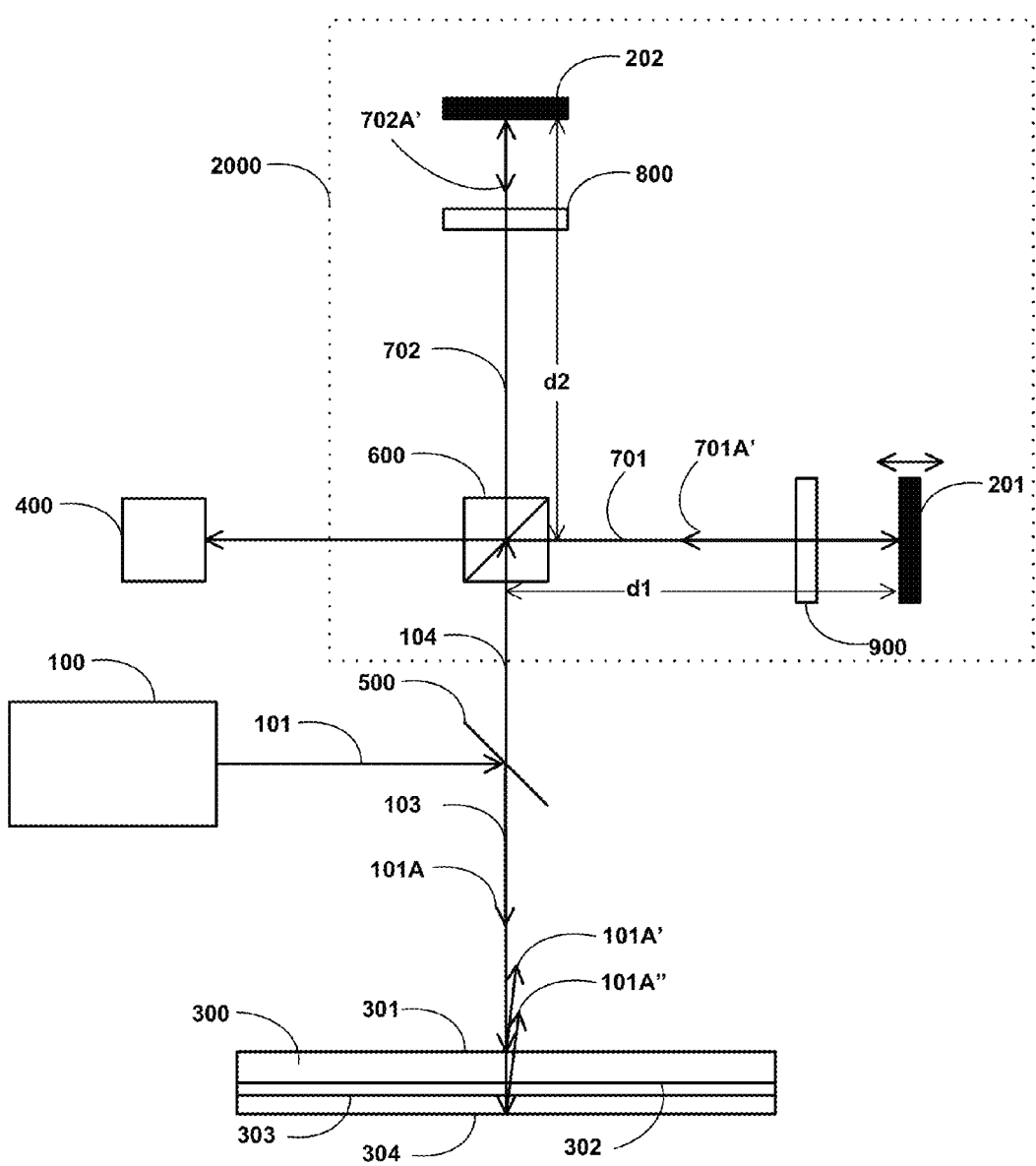
FIG. 6A is a schematic of an embodiment of a Common path Low Coherence Interferometer system with Reference Field Selector with the sample with multiple interfaces.
Figure 6B:
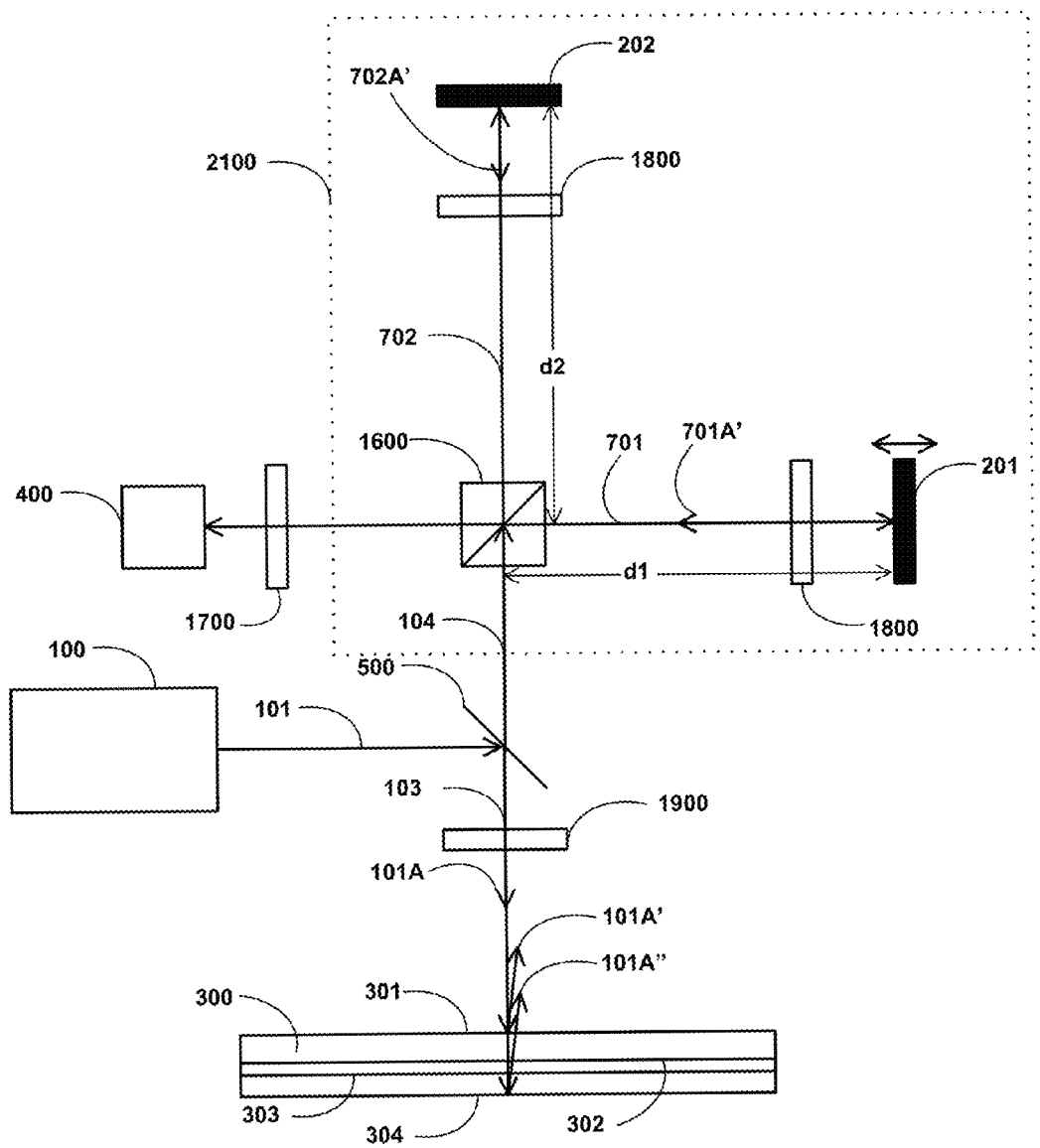
FIG. 6B is a schematic of an embodiment of Common path Low Coherence Interferometer system using cross polarized beam and polarization discriminating elements.

The fixed off set frequency domain optical coherence tomography (FOFD-OCT) is low coherence interferometry using at least an infrared (IR) source with wavelengths $>1.1\mu$ and an infrared spectrograph with an infrared charged coupled device (IRCCD) array. Sources in ultraviolet (UV), visible and optical infrared may be used when appropriate along with appropriate detector. The incidence angle may be set at an appropriate value between 0 degrees and 90 degrees with respect to sample surface normal. The dispersion of the spectrograph is such that the per pixel bandwidth could accommodate a coherence length that is ~2× feature depth/height or a coherence length that is influenced by the location of the virtual interface. This facilitates implementing frequency domain optical coherence tomography to measure trench depth or hole depth or feature height in a substrate. As shown in FIGS. 3, 6A and 6B, infrared light incident on each interface is partially reflected by the first interface. Transmitted wavefront undergoes reflection and transmission at every interface that beam 103 encounters. The reflected composite beam enters a improved auto-correlator optical unit 2000 configuration similar to that in FIG. 6A or 6B.

Figure 7:
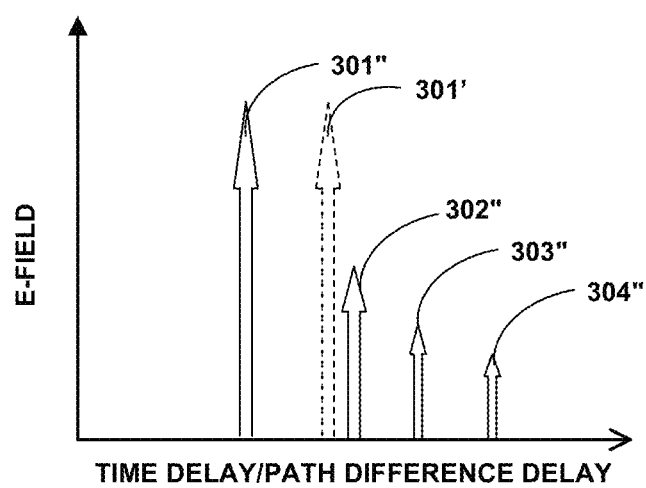
FIG. 7 is a graphical representation of e-fields from the sample with multiple interfaces seen by detector in the presence of Reference Field Selector and beam path offset.

The element 900 in beam path 701 suppresses all secondary reflections except for the dominant one from interface 301. Such an element may possess linear or non-linear transmission property. This e-field represented by 301' in FIG. 7 can be used as the reference field to generate interference pattern with reflected fields from various optical interfaces. From this interference pattern, depth or height value and profile information of features present in the sample can be discerned. The autocorrelation of the reflected sample beam in the improved auto-correlator optical unit 2000 along with the use of reference field selector makes the embodiment described in this invention robust and insensitive to environmental disturbances. Creation and use of virtual interfaces enhances measurement dynamic range independent of the source coherence length. Use of backside illumination allows the measurement approach to be aspect ratio neutral. Use of Effective Medium Approximation to model the sample allows the measurement approach to be aspect ratio neutral and illumination side neutral. That means the measurement is not influenced by errors due to wave-guiding in high aspect ratio embedded features.

In the first embodiment of the present invention, shown in FIG. 3, a beam of light from source 100 capable of producing single or multiple wavelengths is incident on the backside or front side of the substrate to be measured. Optical thickness measurement from wafer backside was proposed by the inventor in U.S. Pat. No. 6,261,152. In this embodiment, either optical fibers or free space propagation is used to launch and receive light 103. The reflected light is conveyed to an auto-correlator optical unit 1000. The two mirrors in the auto-correlator optical unit 1000 are adjusted so that arms 701 and 702 have a pre-fixed path difference between them. This can be achieved while the auto-correlator optical unit 1000 is being assembled. In this configuration, the signal received by the detector can be represented as shown in FIG. 5. The path length difference between the two arms 701, 702 in the auto-correlator optical unit 1000 is adjusted to be within the coherence length dictated by the pixel dispersion of the spectrograph. This enables coherent interference of optical fields from the virtual interface and other interfaces at the detector plane. A fringe pattern can be observed if the detector 400 is a spectrograph and it will carry phase or optical path difference information corresponding to separation between various interfaces and the virtual interface.

With the use of virtual interface, the path length difference between the various interfering beams are much smaller than in the prior art configuration shown in FIG. 1A. Consequently, the fringe spacing in the recorded fringe pattern would be larger and hence a spectrograph with lower dispersion can be used. Such spectrographs are more cost effective than a high dispersion spectrograph. The detector/spectrograph 400 used can have a per pixel bandwidth that can accommodate a coherence length that is ~2× feature depth/height or a coherence length that is influenced by the location of the virtual interface. This allows coherent interference between all light beams traversing arms 701 and 702. Referring to FIG. 5, interference between 301' & 301", 301' & 302", and 302' & 302" will provide information on mirror offset and interface separation. A fast Fourier transform of the fringe pattern will parse out different thickness information present in the detected signal. Using a simple algorithm, thickness values can be sorted through and correct value can be assigned to the different optical thicknesses.

The advantage of this approach is that it affords a large working distance while enabling measurement over large dynamic range. Static mirrors mean larger mean time between failures than prior art movable/scanning mirrors shown in FIG. 1A. By dividing the optical thicknesses by sample refractive index, the physical thickness of the layers can be determined. Fourier Transform can be performed using a computer routine called FFT (Fast Fourier Transform).

The same embodiment shown in FIG. 3 can be used in time domain optical coherence tomography mode for detecting various interface thicknesses by scanning mirror 201 and noting its corresponding position at every intensity spike.

In another embodiment of the invention, shown in FIG. 6A, a filtering element 900 is positioned in arm 701. Filtering element 900 helps to select the field corresponding to the largest intensity spike 301' in arm 701 as the reference field in the auto-correlator optical unit 2000. As in the previous embodiment, a fast Fourier transform of the fringe pattern will parse out all thickness information present in the fringe pattern. Since there is only one electric field associated with reference beam, every power spectral density (PSD) peak in the fast Fourier transform signal will correspond to a unique optical path difference. The extra optical path by filtering element 900 can be compensated for by adding plate 800 in arm 702 or by moving mirror 202 by an appropriate distance.

The embodiment in FIG. 6A can be used in time domain optical coherence tomography mode for detecting various interface thicknesses by scanning mirror 201 and noting its corresponding position at every intensity spike.

In another embodiment, shown in FIG. 6B, a single reference field is selected through polarization control. To achieve that, the beam 101 from the source 100 is first manipulated to contain only s- and p-polarizations as beams 101s and 101p. The beams 101s and 101p are then directed towards the sample 300 via beam splitter 500 as beams 101As and 101Ap. Before interacting with the sample 300, the beams 101As and 101Ap passes through an element 1900 that reflects one of the polarization beams 101As, 101Ap and passes the other of the polarization beams 101As, 101Ap and thus element 1900 is a reflective and transmissive element.

In the auto-correlator optical unit 2100, the reflected beam 101As or 101Ap can be used as the reference beam for thickness measurement by using polarization beam splitter (PBS) 1600. The element 1900 can be positioned as close to the sample 300 as possible. This minimizes the error in measurement due to path separation. The auto-correlator optical unit 2100 has a polarizing beam splitter 1600 that separates the s-polarization from p-polarization. When element 1900 is rotated through 90 degrees, then s-polarized beam 101As will be the one beam reflected by the element 1900 and the sample beam 101A' reflected from the sample 300 will be the p-polarized beam 101Ap. For these two orthogonally polarized beams 101As and 101Ap to interfere at the detector plane, quarter wave plates QW 1700 are positioned in 701 and 702 along with a 45 degree polarizer in front of the 400.

This embodiment can also be used in both time domain and frequency domain modes.

Figure 8:
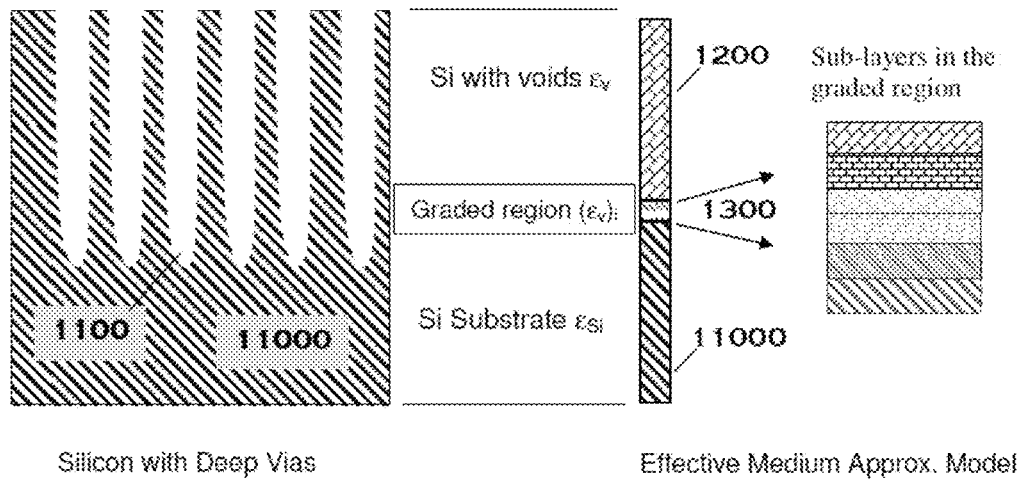
FIG. 8 illustrates an effective medium approximation (EMA) model of a silicon wafer with high aspect ratio features.

Once the through silicon via depth is known, the present invention provides a methodology for determining average profile of through silicon vias. A light source 100 with bandwidth that covers suitable spectral range in wavelength region of interest is used for profile extraction. The spectrograph used to detect reflected light can have appropriate dispersion compared to the one used in depth measurement to cover the required bandwidth. To simulate the detected spectral signature, the sample is modeled using effective medium approximation (EMA) See references 6-11. The approach taken to build the model is shown in FIG. 8. The region of the wafer that embeds through silicon via structures 1100 is composed of a mixture of air and Si instead of homogeneous silicon material. This region can therefore be thought as a homogeneous medium with an effective dielectric function. This effective dielectric function characterizes a uniform layer but with sharp boundary that produces an optical effect similar to that produced by the pattern wafer. The effective dielectric function for the polarization perpendicular to the pattern $\in_\perp$ and parallel to the pattern $\in_\parallel$ can be expressed as follows:

For hole pattern with perpendicular polarization:

$$\varepsilon_\perp = \varepsilon_1 \left[ 1 - f \frac{2(\varepsilon_1 - \varepsilon_2)}{(\varepsilon_1 + \varepsilon_2) + f(\varepsilon_1 - \varepsilon_2)} \right] \quad (1)$$

For trench pattern with perpendicular polarization:

$$\frac{1}{\varepsilon_\perp} = \frac{1-f}{\varepsilon_1} + \frac{f}{\varepsilon_2} \quad (2)$$

Figure 9:
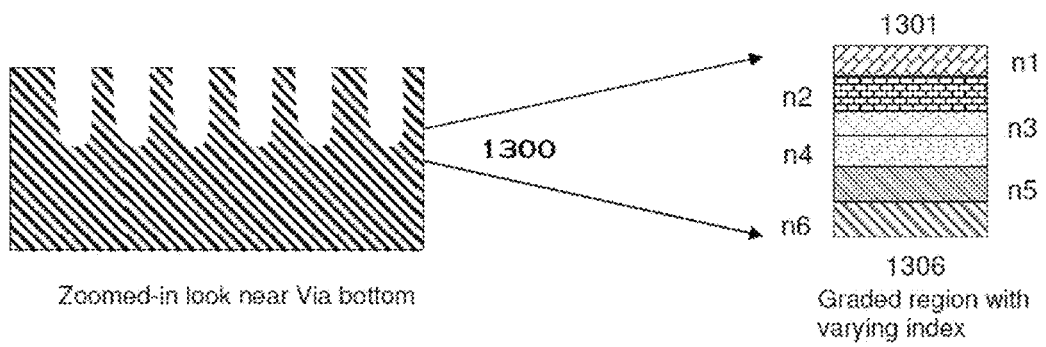
FIG. 9 is a detailed view of a through silicon via bottom end and the corresponding effective medium approximation representation of the bottom profile.
Figure 10:
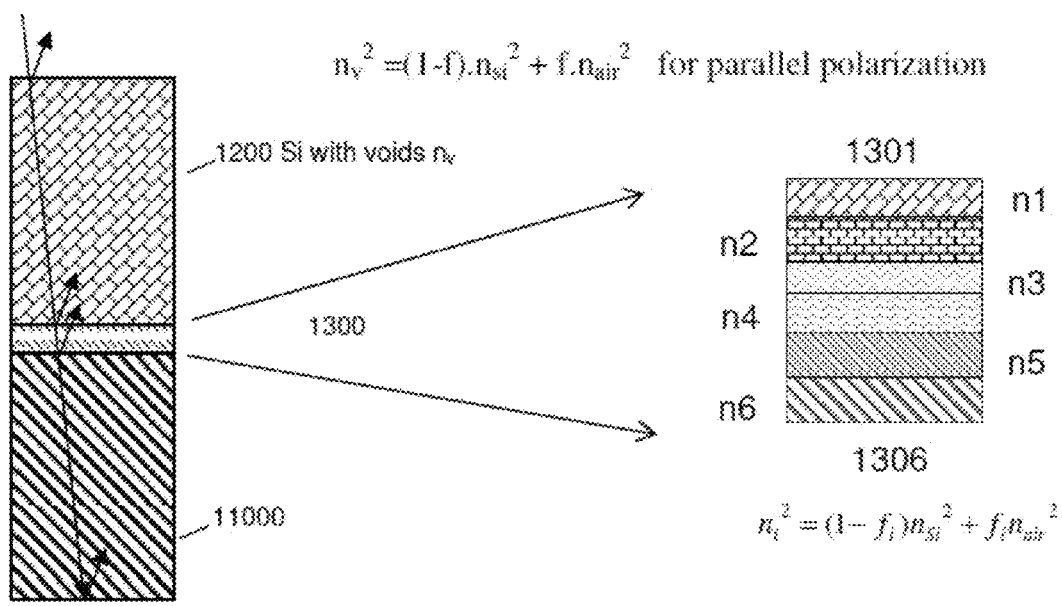
FIG. 10 illustrates an effective medium approximation representation of silicon wafer with through silicon via structures.

For both Patterns with parallel polarization:

$$\in_\parallel = (1-f)\in_1 + f\in_2 \quad (3)$$

Where $\in_1$ and $\in_2$ are the dielectric functions of silicon and through silicon via fill material (e.g. air) respectively and f is the volume fraction of the fill material which is determined from via diameter and number of vias per unit area of the wafer surface. The region 'a' 1200 (silicon with voids) in FIG. 8 represents a uniform layer of this effective medium. Region 'b' 1300 in FIG. 8 represents a graded region which is composed of layers of varying composition or optical constants. The gradation is the result of tapering of the bottom side of the through silicon vias. See FIG. 9. As the vias taper, the fractional volume, 'f', changes in value leading to change in dielectric functions of each sub-layer 1301-1306 in the graded region. Each sub-layer is considered to be made of uniform and homogeneous medium of dielectric functions $(\in_v)_i$ or refractive indices with sharp boundaries. See the schematic representation of this in FIG. 10.

With enough change in fractional volume, the through silicon via taper can be modeled as a series of homogeneous layers or slices of varying optical thickness. The physical thickness of each layer is assumed to be the same and is arrived at with some a prior knowledge of the through silicon via process. Source bandwidth and spectrograph resolution power will depend on the chosen slice thickness and virtual interface location. So from the optical thickness obtained from power spectral density spectrum, the effective dielectric constant of each layer can be determined. Knowing $\in_\perp$ or $\in_\parallel$ or both for individual layer, fractional volume of fill material in each layer can be calculated using equations such as those given above. From the "f" value that corresponds to each effective medium approximation layers, profile of through silicon via cross section can be inferred.

In another approach, the patterned silicon wafer can be modeled as a multi layered heterogeneous film stack made up of several layers of films (of varying optical thickness). The reflectance spectrum from such a sample can be calculated employing techniques typically used in modeling multi-layer film stack. To match the computed spectrum to the measured spectrum a few material parameters can be optimized. The calculated spectrum is a function of the optical thicknesses of regions 1200, 1300, and 11000. From a knowledge of wafer thickness and through silicon via depth obtained using the frequency or time domain optical coherence tomography approach described here, the optical thickness of region 1100 and 1200 can be fixed and need not be changed during optimization routine. In high aspect ratio through silicon vias or trenches, the sidewalls tend to taper beyond a certain depth. From the sectional electron microscope work done during recipe optimization, a through silicon via process engineer will have good idea about the depth from where wall tapering begins. With this knowledge, the search space for the start of the graded region can be narrowed down to a smaller search space. Along with this search parameter, one will have to search, in the graded region, the number of slices and the fractional volume of each slice that will produce a spectrum that correlates well with the measured spectrum, correlation factor→1. From knowledge of these parameters, an average through silicon via profile can be determined.

In another embodiment of the invention similar to that shown in FIGS. 6A and 6B, at least one mirror in the auto-correlator optical unit 2000, 2100 is translated continuously about its offset position. This generates a sinusoidal temporal fringe pattern at every wavelength channel in the spectrograph. These fringes can be analyzed to determine the phase of the spectral fringe at each wavelength. For a given profile the phase vector corresponding to each wavelength will have a unique value. Deviation from this indicates change in profile.

In another embodiment of the invention similar to that shown in FIGS. 6A and 6B, at least one mirror in the auto-correlator optical unit 2000, 2100 is tilted about its optics axis. This generates a sinusoidal spatial fringe pattern at every wavelength channel in the spectrograph. These fringes can be analyzed to determine the phase of the spectral fringe at each wavelength. For a given profile the phase vector corresponding to each wavelength will have a unique value. Deviation from this indicates change in profile.

Figure 11:
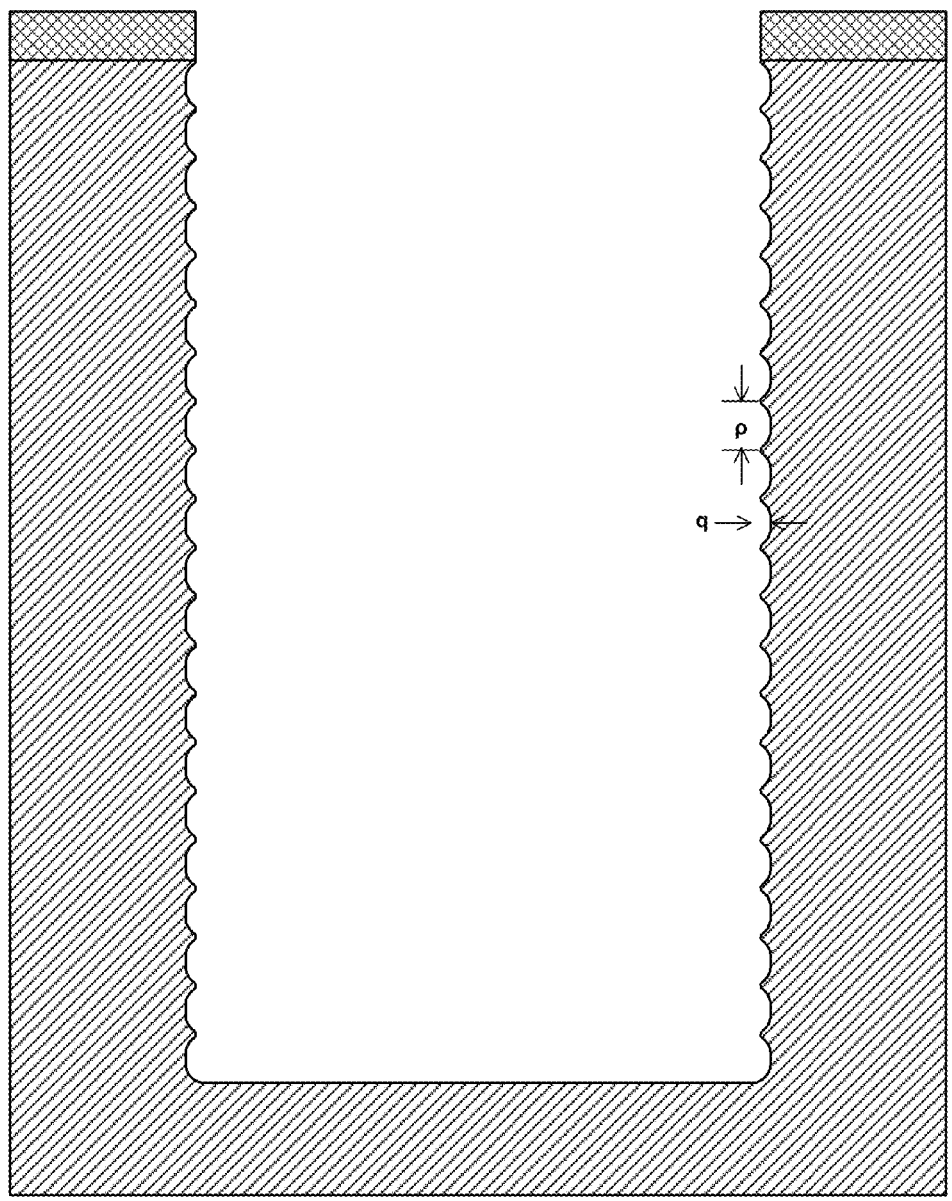
FIG. 11 is a representation of wall roughness and scalloping of through silicon via sidewall during a deep reactive ion etching process.

The effective medium approximation model may be extended to include sidewall roughness (scalloping). This approach would provide an average value of scallop parameters 'p' and 'q' averaged over all the through silicon vias within the footprint of the measurement beam. See FIG. 11.

Figure 2A:
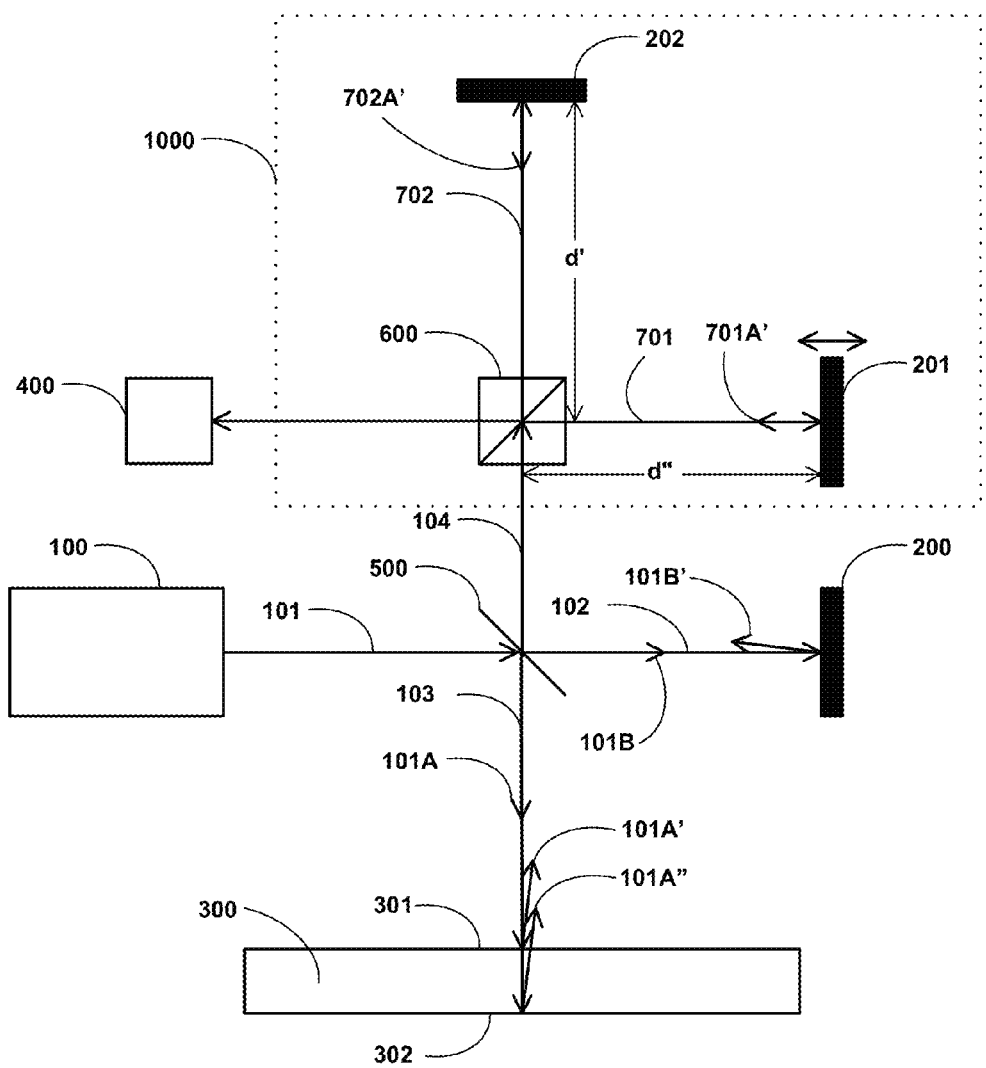
FIG. 2A is a schematic of a typical prior art auto-correlation Low Coherence Interferometer system.
Figure 2B:
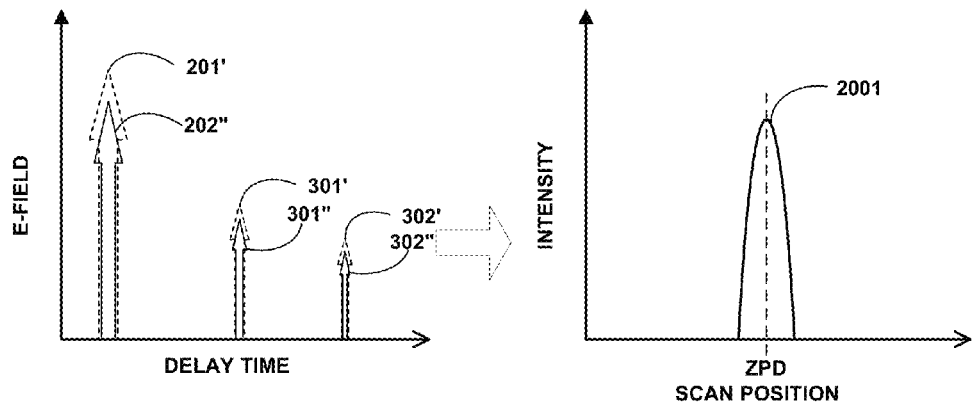
FIGS. 2B and 2C are graphs of pulse mode representations of e-fields from embodiment in FIG. 2A. Intensity spikes are due to interference generated at appropriate scan position.
Figure 2C:
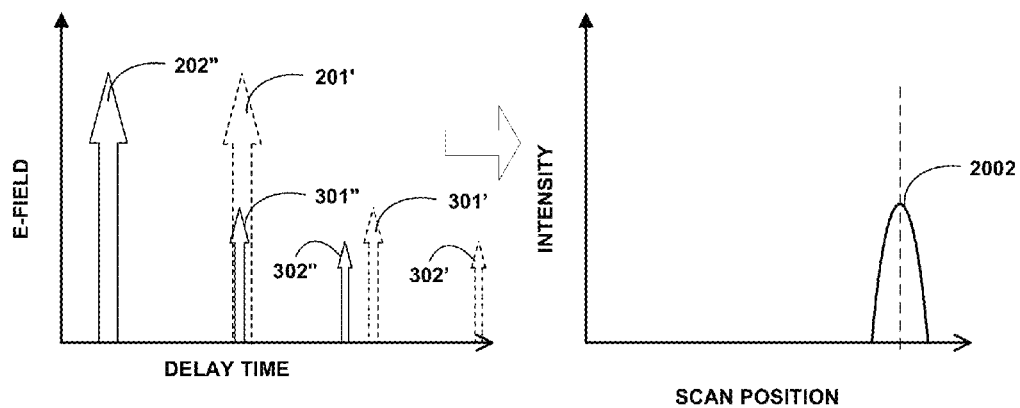

All of the embodiments described here can be used in an angle resolved mode which allows the device to measure and analyze the scattered light from the sample. Angle resolved mode uses off-axis illumination of samples. The embodiments described herein and shown in FIGS. 3, 6A and 6B can also be implemented by including a reference mirror as shown in FIG. 2A.

What is claimed is:

1. A common path auto-correlation low coherence interferometer system comprising:
   a light source having an output directed toward a first beam splitter;
   the first beam splitter configured to direct at least a portion of a light beam output by the light source toward a sample having two reflective interfaces including a top surface reflective interface and a feature bottom reflective interface;
   the first beam splitter further configured to pass toward a second beam splitter each of a reference light beam reflected from the top surface interface and a measurement light beam reflected from the feature bottom reflective interface;
   the second beam splitter configured to direct the reference light beam to a first mirror and the measurement light beam to a second mirror, wherein the first mirror is a first distance from the second beam splitter and the second mirror is a second distance from the second beam splitter;

the second beam splitter further configured to combine a reflected measurement light beam reflected from the second mirror and a reflected reference light beam reflected from the first mirror and direct a resulting interference pattern toward a detector, wherein the first mirror is a scanning mirror such that a difference distance between the first distance and the second distance is equal to an optical separation between the feature bottom reflective interface and the top surface reflective interface; and a filtering element disposed in a beam path between the second beam splitter and the first mirror.

2. The system of claim 1, wherein the second distance is offset from the first distance a known distance.

3. The system of claim 1, wherein the detector is a spectrograph.

4. The system of claim 1, wherein the light source is an ultraviolet light source.

5. The system of claim 1, further comprising a plate disposed in a beam path between the second beam splitter and the second mirror.

6. The system of claim 1, wherein the light source is a polarizing light source and further comprising a selected polarized light beam reflective and transmissive element is disposed in a beam path between the first beam splitter and the sample and the second beam splitter is a polarizing beam splitter.

7. The system of claim 6, further comprising a 45 degree polarizer element disposed in a beam path between the second beam splitter and the detector.

8. The system of claim 1, wherein the detector has a per pixel bandwidth that can accommodate a coherence length that is about twice a feature depth.

9. A common path auto-correlation low coherence interferometer method comprising:

directing a light beam emitted from a light source output toward a first beam splitter;

directing at least a portion of the light beam output by the light source through the first beam splitter toward a sample having two reflective interfaces including a top surface reflective interface and a feature bottom reflective interface;

passing each of a reference light beam reflected from the top surface reflective interface and a measurement light beam reflected from the feature bottom reflective interface through the first beam splitter and toward a second beam splitter;

reflecting the reference light beam through the second beam splitter to a first mirror;

passing the measurement light beam through the second beam splitter to a second mirror, wherein the first mirror is a first distance from the second beam splitter and the second mirror is a second distance from the second beam splitter, wherein the first mirror is a scanning mirror;

combining a reflected measurement light beam from the second mirror and a reflected reference light beam from the first mirror in the second beam splitter;

directing a resulting interference pattern toward a detector; and scanning the first mirror such that a difference distance between the first distance and the second distance is equal to an optical separation between the feature bottom reflective interface and the top surface reflective interface, wherein the light source is a polarizing light source and further comprising a selected polarized light beam reflective and transmissive element is disposed in a beam path between the first beam splitter and the sample and the second beam splitter is a polarizing beam splitter.

10. The method of claim 9, wherein the second distance is offset from the first distance a known distance.

11. The method of claim 9, wherein the detector is a spectrograph.

12. The method of claim 9, wherein the light source is an ultraviolet light source.

13. The method of claim 9, wherein the light source is a visible light source.

14. The method of claim 9, wherein the light source is an infrared light source.

15. The method of claim 9, further comprising a filtering element disposed in a beam path between the second beam splitter and the first mirror.

16. The method of claim 15, further comprising a plate disposed in a beam path between the second beam splitter and the second mirror.

17. The method of claim 15, further comprising a 45 degree polarizer element disposed in a beam path between the second beam splitter and the detector.

18. The method of claim 9, wherein the detector has a per pixel bandwidth that can accommodate a coherence length that is about twice a feature depth.

* * * * *